United States Patent [19]
Nijhawan et al.

[11] 3,990,893
[45] Nov. 9, 1976

[54] LEAD ALLOY FOR BATTERY GRID

[75] Inventors: Subash Chander Nijhawan, Kronberg; Waldemar Borger, Kelkheim, both of Germany

[73] Assignee: Varta Batterie Aktiengesellschaft, Hannover, Germany

[22] Filed: Nov. 6, 1974

[21] Appl. No.: 521,349

[30] Foreign Application Priority Data
Aug. 19, 1974  Germany............................ 2439729

[52] U.S. Cl............................... 75/166 C; 429/226
[51] Int. Cl.²......................................... C22C 11/08
[58] Field of Search...................... 75/166 C; 136/65

[56] References Cited
UNITED STATES PATENTS

| 480,266 | 8/1892 | Knowles........................ 75/166 C X |
| 2,694,628 | 11/1954 | Carroll et al...................... 75/166 C |
| 2,841,491 | 7/1958 | Zahn................................. 75/166 C |
| 3,144,356 | 8/1964 | Dobrovics............................. 136/65 |
| 3,801,310 | 4/1974 | Nijhawan ........................ 75/166 C |
| 3,879,217 | 4/1975 | Peters ............................... 136/65 X |

Primary Examiner—L. Dewayne Rutledge
Assistant Examiner—E. L. Weise
Attorney, Agent, or Firm—Weiser, Stapler & Spivak

[57]     ABSTRACT

Lead alloy for the grids of lead storage batteries, which comprises from 1.0 to 3.5 % antimony, 0.025 to 0.2 % arsenic, 0.005 to 0.1 % selenium, 0.05 to 0.5 % tin, and the remainder lead.

Preferably the alloy also contains 0.025 to 0.1 % silver.

5 Claims, 1 Drawing Figure

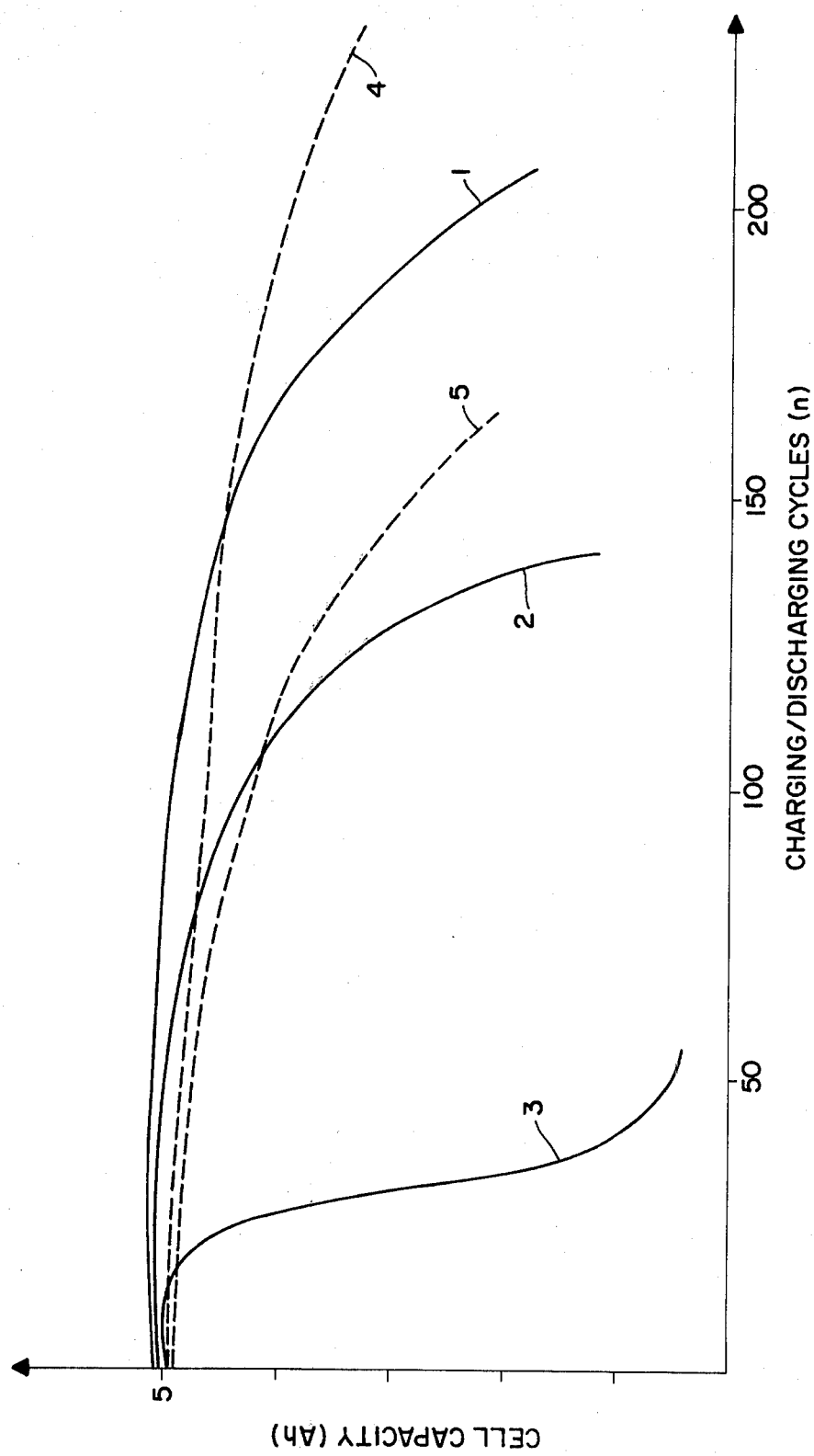

LEAD ALLOY FOR BATTERY GRID

This invention relates to a low antimony lead alloy for storage battery grids.

Low antimony, and antimony-free grid alloys are of great importance in lead storage batteries, particularly for the production of cells which require little or no maintenance. Pure lead cannot be used for the production of grids, because of its inadequate mechanical strength. Lead-calcium alloys (See German Pat. No. 381,049) have drawbacks stemming from the ease with which the calcium oxidizes in the melt, and from the passivation effects which take place electrochemically during usage.

Other antimony-free alloys are disclosed, for example, in British Pat. No. 1,105,548. The advantages of lower hydrogen evolution which characterize such alloys using arsenic, tellurium and silver as alloy ingredients are offset by very low mechanical strength. In addition, difficulties arise during cyclical charging/discharging operation at the outset of the operating period. Low antimony alloys with 1.0 to 3.5% Sb, in addition to 0.025 to 0.2% As and 0.005 to 0.1% Se, 0.01 to 0.05% Sn are disclosed in U.S. Pat. No. 3,801,310. These alloys exhibit desirable properties during casting, as well as good mechanical strength.

It is known that the inadequate cyclical stability of antimony-free cells is attributable to passivation of the positive plates. This involves formation of insulating cover layers between the grid and the positive mass which impede discharging of the plate or, in the limiting case, prevent it entirely. These effects also occur, although to a lesser degree, in cells with grids having less than 3.5% antimony.

Accordingly, it is an object of the invention to provide a low antimony Pb-Sb alloy which particularly extends the useful life of cells used consistently in a cyclical mode.

This object, as well as others which will appear, are achieved in accordance with the invention by forming the alloy of about 1.0 to 3.5% antimony, about 0.025 to 0.2% arsenic, about 0.005 to 0.1% selenium, about 0.05 to 0.5% tin, the remainder being lead. All percentages are by weight.

Preferably, the alloy contains 0.2 to 0.5% Sn. Preferred alloys have the composition of 1.5 to 2% antimony, 0.04 to 0.075% arsenic, 0.01 to 0.03% selenium, 0.2 to 0.4% tin, the remainder being lead.

To further improve the mechanical and electrochemical properties, 0.025 to 0.1% Ag may be added.

The single figure of drawing shows certain operating characteristics of embodiments of the invention.

It has been found that the increase in tin content, particularly to 0.2 to 0.5%, produces a quite considerable improvement in the life of steadily cyclically used cells. This may be attributed to the formation of $SnO_2$ at the grid/mass boundary layer of the positive electrode. It is generally believed that the reactions at the $PbO_2$ electrode during charging and discharging pass through the solution stage. Therefore, nucleus formation processes at the positive electrode must play an important role in its capacity characteristic. $SnO_2$, like $\beta\text{-}PbO_2$ has a rutile structure and can therefore serve as the nucleus for the crystallization of $\beta\text{-}PbO_2$. These $SnO_2$ nuclei do not take part in the discharge reaction and prevent the formation of dense lead sulphate layers with low electrical conductivity because they stabilize the morphological relationships in the boundary layer between grid and mass. This again leads to improved dischargeability of the positive electrode and, with it, to an increase in the cycling life of the cell.

In the low antimony alloys described in the above-mentioned U.S. Pat. No. 2,801,310 an increase in tin content above about 0.03% can lead to a reduction in the casting qualities due to the tendency of the alloy to form drippings and fibers. However, its operating capacities are not unfavorably affected. By use of appropriate casting techniques, which permit catching of the lead drippings, it is possible to avoid the unfavorable effect of such dripping upon the casting characteristics. In addition, it has been found that, for Sn contents greater than about 0.2%, the tendency toward dripping and fiber formation again decreases.

EXAMPLE 1

Grids were made of an alloy with 1.6% Sb, 0.05% As, 0.02% Se and 0.2% Sn, the remainder being lead. By applying to these grids positive and negative masses of conventional composition, plates were prepared. The positive and negative plates so obtained were assembled in conventional manner in plate block containers and, after being filled with sulphuric acid, were formed with a current corresponding to 400 Ah/kg of positive mass. The nominal capacity of cells so produced was 5Ah. In the drawing, to which reference may now be had, there are shown the variations in cell ampere-hour capacity as a function of the number of repeated charging and discharging cycles for a variety of cells. Curve 1 shows this variation for the cell made in accordance with this Example upon repeated chargings and dischargings with 0.05 $K_{20}A$ (0.25A) down to a cell voltage of 1.7V. For comparison, curve 2 is provided, which shows the capacity variation for lead cells of the same construction but with an alloy (1.6% Sb, 0.05% As, 0.02% Se) containing only 0.02% Sn. Curve 3 shows the capacity variation of cells whose grids contain neither antimony nor tin. Thus, the alloy according to the invention provided a 50% improvement in cycling life.

EXAMPLE 2

Grids were cast from an alloy having 2.5% Sb, 0.05% As, 0.02% Se and 0.5% Sn, the remainder being lead. These were made into positive and negative plates as described in Example 1. The production and formation of the cells (of nominal 5Ah capacity) also took place as in Example 1. In the drawing, the variation in capacity of these cells is shown in curve 4 upon repeated chargings and dischargings with 0.2 $K_{20}A$ (1A). For comparison, there is shown in curve 5 the corresponding capacity variation of cells whose grids are formed of an alloy with 2.5% Sb, 0.05% As, 0.02% Se and 0.01% Sn, the remainder being lead. The ending discharge voltage again was 1.7V. As appears from the drawing, increase of the Sn content to 0.5% leads to a quite considerable increase in cycling life.

By means of an Ag addition of 0.025 to 0.1% the structure is thermally stabilized and undesirable effects attributable to heat treatment and storage are suppressed.* The addition of Ag is especially desirable for batteries subject to high requirements with respect to mechanical strength, ductility, corrosion resistance and electrochemical behavior of the grid alloys. Through thermal stabilization there are prevented certain structural changes, such as grain coarsening and discontinuous precipitation, which are deleterious to the after treatment of the grids used to bring them to their greatest mechanical strengths. Coarse grain structure and discontinuous precipitation reduce the ductility and the corrosion resistance and thereby also have a negative effect on the electrochemical properties, e.g. those pertaining to gassing and water loss.

*With alloys containing between 1.5% and 2% Sb as discussed in the examples the Ag addition is preferably between 0.03 – 0.06%

With respect to the composition of all the alloys embodying the invention, it should be noted that these need not be precisely limited to the specific ingredients listed, in their pure forms. Rather, various impurities can also be present, provided they do not adversely affect the advantages characteristic of the alloy as specified.

For example, alloys according to the invention permit omission of a cell manufacturing step which is otherwise customarily employed, namely that of passing steam through the melt to remove impurities. Such impurities adversely influence the alloys embodying the invention much less than alloys which do not. As a result, up to 0.2% of any one or more of bismuth, tellurium or copper, and up to 0.1% zinc and/or up to 0.01% iron may also be present in the alloy.

We claim:
1. A low antimony lead alloy for storage battery grids, comprising 1.0 to 3.5% antimony, 0.025 to 0.2% arsenic, 0.005 to 0.1% selenium, tin in a range from more than 0.05 to 0.5%, the remainder being substantially all lead.
2. The alloy of claim 1 which contains 0.2 to 0.5% tin.
3. The alloy of claim 2, comprising 1.5 to 2% antimony, 0.04 to 0.075% arsenic, 0.01 to 0.03% selenium, 0.2 to 0.4% tin, the remainder being substantially all lead.
4. The alloy of claim 1, which also comprises 0.025 to 0.1% silver.
5. A low antimony lead alloy for storage battery grids, consisting essentially of 1.0 to 3.5% antimony, 0.025 to 0.2% arsenic, 0.005 to 0.1% selenium, more than 0.05 to 0.5% tin, the remainder being lead.

* * * * *